United States Patent
More

(10) Patent No.: US 8,620,020 B2
(45) Date of Patent: Dec. 31, 2013

(54) METHODS AND SYSTEMS FOR PREVENTING UNAUTHORIZED DISCLOSURE OF SECURE INFORMATION USING IMAGE FINGERPRINTING

(71) Applicant: Workshare Technology, Inc., San Francisco, CA (US)

(72) Inventor: Scott More, Tokyo (JP)

(73) Assignee: Workshare Technology, Inc., San Francisco, CA (US)

( * ) Notice: Subject to any disclaimer, the term of this patent is extended or adjusted under 35 U.S.C. 154(b) by 0 days.

(21) Appl. No.: 13/659,817

(22) Filed: Oct. 24, 2012

(65) Prior Publication Data

US 2013/0051609 A1 Feb. 28, 2013

Related U.S. Application Data

(62) Division of application No. 12/275,185, filed on Nov. 20, 2008, now Pat. No. 8,406,456.

(51) Int. Cl.
*G06K 9/00* (2006.01)
*H04N 7/167* (2011.01)
*H04L 9/32* (2006.01)

(52) U.S. Cl.
USPC ........................... 382/100; 382/202; 713/176

(58) Field of Classification Search
USPC ................. 382/100, 101, 176, 190, 286, 294; 707/698; 705/58, 406; 380/55, 202; 713/176
See application file for complete search history.

(56) References Cited

U.S. PATENT DOCUMENTS 4,479,195 A 10/1984 Herr et al.
4,949,300 A 8/1990 Christenson et al.
5,008,853 A 4/1991 Bly et al.
5,072,412 A 12/1991 Henderson, Jr. et al.
5,220,657 A 6/1993 Bly et al.
5,245,553 A 9/1993 Tanenbaum
5,247,615 A 9/1993 Mori et al.

(Continued)

FOREIGN PATENT DOCUMENTS

JP 10177650 A 6/1998
JP 2004265267 A 9/2004

(Continued)

OTHER PUBLICATIONS

V. Monga, B.L. Evans Perceptual image hashing via feature points: performance evaluation and tradeoffs IEEE Transactions on Image Processing, 15 (11) (2006), pp. 3453-3466.*

(Continued)

*Primary Examiner* — Andrae S Allison
(74) *Attorney, Agent, or Firm* — Perkins Coie LLP

(57) ABSTRACT

The present invention provides methods and systems to protect an organization's secure image information from unauthorized disclosure. In one embodiment, methods and systems to generate image fingerprints are provided. The fingerprints are generated for each feature point of an image data. Because the fingerprints take into account the neighborhood features around each feature point, the image fingerprints are robust against derivative images where the original image may have been altered. Methods and systems to maintain a fingerprint database for an organization's secure image data is also provided. In one embodiment, client fingerprints are generated for image data that a user intends to transmit outside of the organization. In some embodiments, suitable security actions are initiated if any of the client fingerprints match any of the fingerprints in the fingerprint database.

17 Claims, 5 Drawing Sheets

(56) References Cited

U.S. PATENT DOCUMENTS

| | | |
|---|---|---|
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,634,062 A | 5/1997 | Shimizu et al. |
| 5,671,428 A | 9/1997 | Muranaga et al. |
| 5,699,427 A | 12/1997 | Chow et al. |
| RE35,861 E | 7/1998 | Queen |
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,898,836 A | 4/1999 | Freivald et al. |
| 6,003,060 A | 12/1999 | Aznar et al. |
| 6,012,087 A | 1/2000 | Freivald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,285,999 B1 | 9/2001 | Page |
| 6,301,368 B1 | 10/2001 | Bolle et al. |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,513,050 B1 | 1/2003 | Williams et al. |
| 6,547,829 B1 | 4/2003 | Meyerzon et al. |
| 6,560,620 B1 | 5/2003 | Ching |
| 6,584,466 B1 | 6/2003 | Serbinis et al. |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,738,762 B1 * | 5/2004 | Chen et al. .................... 707/719 |
| 7,035,427 B2 | 4/2006 | Rhoads |
| 7,107,518 B2 | 9/2006 | Ramaley et al. |
| 7,152,019 B2 | 12/2006 | Tarantola et al. |
| 7,212,955 B2 | 5/2007 | Kirshenbaum et al. |
| 7,240,207 B2 * | 7/2007 | Weare .......................... 713/176 |
| 7,299,504 B1 | 11/2007 | Tiller et al. |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,624,447 B1 | 11/2009 | Horowitz et al. |
| 7,627,613 B1 | 12/2009 | Dulitz et al. |
| 7,673,324 B2 | 3/2010 | Tirosh et al. |
| 7,680,785 B2 | 3/2010 | Najork |
| 7,694,336 B2 | 4/2010 | Rinkevich et al. |
| 7,720,256 B2 * | 5/2010 | Desprez et al. ............... 382/101 |
| 7,730,175 B1 | 6/2010 | Roesch et al. |
| 7,844,116 B2 * | 11/2010 | Monga .......................... 382/190 |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 8,005,277 B2 | 8/2011 | Tulyakov et al. |
| 8,042,112 B1 | 10/2011 | Zhu et al. |
| 8,181,036 B1 | 5/2012 | Nachenberg |
| 8,286,171 B2 | 10/2012 | More et al. |
| 8,406,456 B2 | 3/2013 | More |
| 8,473,847 B2 | 6/2013 | Glover |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0087515 A1 | 7/2002 | Swannack et al. |
| 2002/0099602 A1 | 7/2002 | Moskowitz et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0037010 A1 | 2/2003 | Schmelzer |
| 2003/0131005 A1 | 7/2003 | Berry |
| 2003/0158839 A1 | 8/2003 | Faybishenko et al. |
| 2003/0223624 A1 * | 12/2003 | Hamid .......................... 382/124 |
| 2004/0002049 A1 | 1/2004 | Beavers et al. |
| 2005/0138540 A1 | 6/2005 | Baltus et al. |
| 2005/0251748 A1 | 11/2005 | Gusmorino et al. |
| 2006/0005247 A1 | 1/2006 | Zhang et al. |
| 2006/0021031 A1 | 1/2006 | Leahy et al. |
| 2006/0050937 A1 * | 3/2006 | Hamid .......................... 382/124 |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0098850 A1 * | 5/2006 | Hamid .......................... 382/124 |
| 2006/0112120 A1 * | 5/2006 | Rohall .......................... 707/101 |
| 2006/0171588 A1 | 8/2006 | Chellapilla et al. |
| 2006/0218004 A1 | 9/2006 | Dworkin et al. |
| 2006/0224589 A1 | 10/2006 | Rowney et al. |
| 2006/0236246 A1 | 10/2006 | Bono et al. |
| 2006/0261112 A1 | 11/2006 | Gates et al. |
| 2006/0271947 A1 | 11/2006 | Lienhart et al. |
| 2006/0294468 A1 | 12/2006 | Sareen et al. |
| 2007/0005589 A1 | 1/2007 | Gollapudi |
| 2007/0025265 A1 | 2/2007 | Porras et al. |
| 2007/0101154 A1 | 5/2007 | Bardsley et al. |
| 2007/0101413 A1 | 5/2007 | Vishik et al. |
| 2007/0192728 A1 | 8/2007 | Finley et al. |
| 2007/0253608 A1 * | 11/2007 | Tulyakov et al. ............. 382/125 |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2008/0033913 A1 | 2/2008 | Winburn |
| 2008/0080515 A1 | 4/2008 | Tombroff et al. |
| 2008/0082529 A1 | 4/2008 | Mantena et al. |
| 2008/0219495 A1 | 9/2008 | Hulten et al. |
| 2008/0320316 A1 | 12/2008 | Waldspurger et al. |
| 2009/0034804 A1 | 2/2009 | Cho et al. |
| 2009/0064326 A1 | 3/2009 | Goldstein |
| 2009/0129022 A1 | 5/2009 | Wu et al. |
| 2009/0241187 A1 * | 9/2009 | Troyansky ...................... 726/22 |
| 2010/0017850 A1 * | 1/2010 | More et al. ...................... 726/2 |
| 2010/0064372 A1 * | 3/2010 | More et al. .................... 726/26 |
| 2010/0070448 A1 | 3/2010 | Omoigui |
| 2010/0114985 A1 | 5/2010 | Chaudhary et al. |
| 2010/0114991 A1 | 5/2010 | Chaudhary et al. |
| 2010/0299727 A1 | 11/2010 | More et al. |

FOREIGN PATENT DOCUMENTS

| | | |
|---|---|---|
| JP | 2007299364 A | 11/2007 |
| KR | 1020010078840 | 8/2001 |
| KR | 20040047413 A | 6/2004 |
| KR | 1020060048686 | 5/2006 |
| KR | 200070049518 A | 5/2007 |
| KR | 1020080029602 | 4/2008 |
| WO | WO-0060504 A1 | 10/2000 |

OTHER PUBLICATIONS

Tulyakov et al, Symmetric Hash Functions for Fingerprint Minutiae, ICAPR 2005, LNCS 3687, pp. 30-38, 2005.*

PC Magazine "Pure Intranets: Real-Time Internet Collaboration", http://www.zdnet.com/pcmag/featuresgroupware/gpwst.htm, Aug. 30, 2001, 2 pages.

(56) References Cited

OTHER PUBLICATIONS

Wells et al., "Groupware & Collaboration Support", www.objs.com/survey/groupwar.htm, Aug. 30, 2001, 10 pages.
Tsai, et al., "A Document Workspace for Collaboration and Annotation based on XML Technology", IEEE, 2000, pp. 165-172.
Roussev, et al., "Integrating XML and Object-based Programming for Distributed Collaboration", IEEE, 2000, pp. 254-259.
XP-002257904, "Workshare Debuts Synergy", 2003, 3 pages.
Microsoft, "Microsoft XP, Product Guide", pp. 1-26, 2001.
Weiss et al., Lightweight document matching for help-desk applications, In: Intelligent Systems and their Applications, IEEE, Vo. 15, Issue:2, pp. 57-61, ISSN 1094-7167, 2000.
Mango, et al., "Perceptual Image Hashing via Feature Points: Performance Evaluation and Tradeoffs," IEEE Transactions on Image Processing, vol. 15, No. 11, Nov. 2006.
Mango, "Robust Perceptual Image Hashing Using Feature Points," http://bluecoat-02/?cfru=aHR0cDovL3NpZ25hbC51Y2UudXRIe GFzLmVkdS9+dmlzaGFsL2hhc2gtcGFydEkucHM=, 2003.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Xuefeng Liang; et al., "Fingerprint Matching Using Minutia Polygons," Pattern Recognition, 2006, ICPR 2006, 18th International Conference on, vol. 1, no., pp. 1046-1049.
Sujoy Roy, et al., "Robust Hash for Detecting and Localizing Image Tampering," Image Processing, 2007, ICIP 2007, IEEE International Conference on, vol. 6, no., pp. V1-117-V1-120, Sep. 16, 2007-Oct. 19, 2007.
Yung, et al., "Generating Robust Digital Signature for Image/Video Authentication," Multimedia and Security Workshop at ACM Multimedia '98, Bristol, U.K., Sep. 1998.
International Search Report of PCT Application No. PCT/IB2002/005821, Jan. 30, 2004, 6 pages.
International Search Report of PCT Application No. PCT/US2009/051313, Mar. 3, 2010, 3 pages.
Written Opinion of PCT Application No. PCT/US2009/051313, Mar. 3, 2010, 4 pages.
International Search Report of PCT Application No. PCT/US2009/056668, Apr. 16, 2010, 9 pages.
Written Opinion PCT Application No. PCT/US2009/056668, Apr. 16, 2010, 4 pages.
International Search Report of PCT Application No. PCT/US2009/065019, Jun. 4, 2010, 6 pages.
Written Opinion PCT Application No. PCT/US2009/065019, Jun. 4, 2010, 5 pages.
International Search Report of PCT Application No. PCT/2009/064919, Jul. 1, 2010, 3 pages.
Written Opinion PCT Application No. PCT/2009/064919, Jul. 1, 2010, 4 pages.
International Search Report of PCT Application No. PCT/US2009/056651, Dated Apr. 21, 2010, pp. 1-3.
Written Opinion PCT/US2009/056651 dated Apr. 21, 2010, pp. 1-5.
International Search Report PCT/US2010/043345 dated Apr. 28, 2011, 3 pages.
Co-pending U.S. Appl. No. 10/136,733, filed Apr. 30, 2002.
Co-pending U.S. Appl. No. 10/023,010, filed Dec. 17, 2001.
Co-pending U.S. Appl. No. 12/177,043, filed Jul. 21, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/209,082, filed Sep. 11, 2008.
Co-pending U.S. Appl. No. 12/844,818, filed Jul. 27, 2010.
Co-pending U.S. Appl. No. 13/620,364, filed Sep. 14, 2012.
Restriction Requirement Mailed Jun. 30, 2006 in U.S. Appl. No. 10/136,733, filed Apr. 30, 2002.
Non-Final Office Action Mailed Mar. 20, 2006 in U.S. Appl. No. 10/136,733, filed Apr. 30, 2002.
Restriction Requirement Mailed Feb. 14, 2005 in U.S. Appl. No. 10/023,010, filed Dec. 17, 2001, Issued Patent No. 7,496,841.
Restriction Requirement Mailed Feb. 5, 2008 in Co-Pending U.S. Appl. No. 10/023,010, filed Dec. 17, 2001, Issued Patent No. 7,496,841.
Notice of Allowance Mailed Oct. 24, 2008 in Co-Pending U.S. Appl. No. 10/023,010, filed Dec. 17, 2001, Issued Patent No. 7,496,841.
Non-Final Office Action Mailed Mar. 16, 2006 in Co-Pending U.S. Appl No. 10/023,010, filed Dec. 17, 2001, Issued Patent No. 7,496,841.
Non-Final Office Action Mailed May 7, 2008 in Co-Pending U.S. Appl. No. 10/023,010, filed Dec. 17, 2001, Issued Patent No. 7,496,841.
Final Office Action Mailed Apr. 17, 2007 in Co-Pending U.S. Appl. No. 10/023,010, filed Dec. 17, 2001, Issued Patent No. 7,496,841.
Non-Final Office Action Mailed Sep. 19, 2011 in Co-Pending U.S. Appl. No. 12/177,043, filed Jul. 21, 2008.
Non-Final Office Action Mailed Jan. 9, 2012 in Co-Pending U.S. Appl. No. 12/177,043, filed Jul. 21, 2008.
Final Office Action Mailed Apr. 16, 2012 in Co-Pending U.S. Appl. No. 12/177,043, filed Jul. 21, 2008.
Non-Final Office Action Mailed Mar. 11, 2011 in Co-Pending U.S. Appl. No. 12/209,096, filed Sep. 11, 2008.
Final Office Action Mailed Aug. 12, 2011 in Co-Pending U.S. Appl. No. 12/209,096, filed Sep. 11, 2008.
Non-Final Office Action Mailed Apr. 27, 2012 in Co-Pending U.S. Appl. No. 12/275,185 of More, S., filed Nov. 20, 2008.
Notice of Allowance Mailed Jun. 26, 2012 in Co-Pending U.S. Appl. No. 12/275,185 of More, S., filed Nov. 20, 2008.
Non-Final Office Action Mailed Aug. 1, 2012 in Co-Pending U.S. Appl. No. 12/621,429 of More, S., filed Nov. 18, 2009.
Non-Final Office Action Mailed Dec. 22, 2011 in Co-Pending U.S. Appl. No. 12/209,082.
Final Office Action Mailed May 10, 2012 in Co-Pending U.S. Appl. No. 12/209,082.
Co-Pending U.S. Appl. No. 13/659,793, filed Oct. 24, 2012.
Notice of Allowance Mailed Jul. 8, 2013 in Co-Pending U.S. Appl. No. 12/209,082 by S. More et al., filed Sep. 11, 2008.
Final Office Action Mailed Jan. 18, 2013 in Co-Pending U.S. Appl. No. 12/844,818 by Glover, R., filed Jul. 27, 2010.
Notice of Allowance Mailed Mar. 13, 2013 in Co-Pending U.S. Appl. No. 12/844,818 by Glover, R., filed Jul. 27, 2010.
Non-Final Office Action Mailed Sep. 19, 2012 in Co-Pending U.S. Appl. No. 12/844,818 by Glover, R., filed Jul. 27, 2010.
Final Office Action Mailed Feb. 1, 2013 in Co-Pending U.S. Appl. No. 12/621,429 by More, S., filed Nov. 18, 2009.
Advisory Action mailed Apr. 12, 2013, in Co-Pending U.S. Appl. No. 12/621,429 by More, S., filed Nov. 18, 2009.
Non-Final Office Action Mailed Mar. 18, 2013 in Co-Pending U.S. Appl. No. 13/659,793 by More, S., filed Oct. 24, 2012.

* cited by examiner

METHODS AND SYSTEMS FOR PREVENTING UNAUTHORIZED DISCLOSURE OF SECURE INFORMATION USING IMAGE FINGERPRINTING

CROSS-REFERENCE TO RELATED APPLICATIONS

This application is a divisional of co-pending U.S. application Ser. No. 12/275,185, entitled "Methods and Systems For Image Fingerprinting", filed Nov. 20, 2008, the contents of which is expressly incorporated by reference herein.

This application is related to U.S. application Ser. No. 13/659,793, entitled "Methods and Systems for Image Fingerprinting", filed Oct. 24, 2012, U.S. application Ser. No. 12/177,043, entitled "Methods and Systems To Fingerprint Textual Information Using Word Runs", filed Jul. 21, 2008, now U.S. Pat. No. 8,286,171; U.S. application Ser. No. 12/209,096, entitled "Methods and Systems To Implement Fingerprint Lookups Across Remote Agents", filed Sep. 11, 2008, and U.S. patent application Ser. No. 12/209,082, entitled "Methods and Systems For Protect Agents Using Distributed Lightweight Fingerprints", filed Sep. 11, 2008, the contents of which are all incorporated by reference as if fully set forth herein.

TECHNICAL FIELD

The present invention relates to information security and more specifically it relates to systems and methods for detecting and preventing unauthorized disclosure of secure information. Furthermore, the present invention pertains to fingerprinting image data.

BACKGROUND

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Additionally, the organizations face the challenge of categorizing and maintaining the large corpus of digital information across potentially thousands of data stores, content management systems, end-user desktops, etc. It is therefore important to the organization to be able to store concise and lightweight versions of fingerprints corresponding to the vast amounts of image data.

Many organizations store sensitive data in the form of digital images. Image data is susceptible to being transformed from its original form to a derivate form. Examples of derivative image data include image file format conversion (e.g., changing a BMP image format to a JPEG image format, etc.), cropping the original image, altering dimensions of the original image, change in scale and/or orientation of the original image, rotation of the image by an angle, etc.

Therefore, it is critical to the organization's security to be able to identify derivative forms of the secure image data and identify any unauthorized disclosure of even such derivative forms. Therefore, any system or method built to accomplish this task of preventing unauthorized disclosure would have to address at least these two conflicting challenges.

One method to detect derivative image data is to sample features across the entire original image, record the values of the sampled features, and perform a nearest neighbor search of the sampled features. The nearest neighbors on the original image are compared against the nearest neighbors of the image being inspected to detect similarities. In one example of this prior art method, a histogram of RGB pixel values is generated for the entire original image, and compared against a histogram of RGB pixel values generated for the entire image to be inspected. If the histograms of the original image and the image being inspected are approximately similar, a similarity is detected. However, this entire image approach is not suitable for partial image matches (e.g., when the image to be inspected is only a portion of the original image), and does not handle several types of transformations in a derivate image. For example, cropping the image to be inspected in half drastically changes its global characteristics, and will therefore escape detection when compared against the original image.

Other methods operate on local regions of the image, improving the ability to detect derivative image data. These methods are predominantly broken into two steps. In the first step, distinct features (hereinafter "feature points") are identified within the image. The feature points are identified by locating edges or corners within the image. Other algorithmic approaches may also be employed to identify feature points. Examples of such algorithmic approaches include Harris detection, Moravec detection, Shi and Tomasi detection, Harris-Laplace detection, FAST, SIFT, etc.

In the second step, descriptors are computed by examining the regions surrounding the feature points. The descriptors are recorded and searched to correlate derived regions within the image. Examples of the descriptor methods include creating a histogram, employing SIFT, using steerable filters, or using moment invariants.

However, this approach also suffers from several disadvantages. The first disadvantage is that the descriptors are large, and therefore occupy a large space. The cost and efficiency associated with storing and maintaining these large descriptors compound and increase with an increase in the amount of digital information an organization intends to protect. Additionally, comparing feature points involves searching through a highly dimensional space, making this approach computationally slow.

SUMMARY

Methods and systems to provide efficient means to monitor and protect an organization's secure image information using image fingerprints is provided. In one embodiment, the present invention provides methods and systems to fingerprint image data. In some instances, the image data is normalized to a canonical format. Feature points are identified in the normalized image data. A plurality of closest neighbors is determined for each feature point.

In one embodiment, an anchor point is identified among the plurality of closest neighbors of each feature point. In some instances, the distance between the feature point and each of its closest neighbors is calculated relative to the distance between the feature point and the anchor point. Similarly, in some instances, the angle between the feature point and its closest neighbors is computed relative to the angle between the feature point and the anchor point. In one embodiment, the angle and distance information is used to generate a point vector. A hash function is then applied over the point vectors to generate a fingerprint for the corresponding feature point.

In one embodiment, methods and systems to maintain an image fingerprint based security mechanism is provided. Here, a fingerprint server maintains image fingerprints corresponding to secure image data that an organization desires to protect. In some instances, client systems (e.g., a user's personal computer) are monitored, and fingerprints are generated for any image data that the user desires to transmit outside of the organization. In some instances, the client fingerprints are compared and matched against the fingerprints in the fingerprint server. If any of the fingerprints from the client systems match any of the fingerprints in the fingerprint server, an appropriate security event is initiated (e.g., blocking the user's access to an image data file, etc.).

In some instances, when generating the fingerprints, the angles and distances are computed relative to the anchor point. The angles and distances are computed using a predetermined direction of rotation about the feature point. This ensures that similar fingerprints are generated for the original image data and derivate versions where the image data is rotated or skewed by an angle. Additionally, since the fingerprints capture the features of their neighborhood (for example, by calculating point vectors of closest feature points), the fingerprints are robust against variations in a derivate image data (e.g., when the original image is cropped). Additionally, a single fingerprint is computed for all point vectors corresponding to a feature point's neighborhood. This allows for efficient and lower cost establishment and maintenance of an organization's secure fingerprint database.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
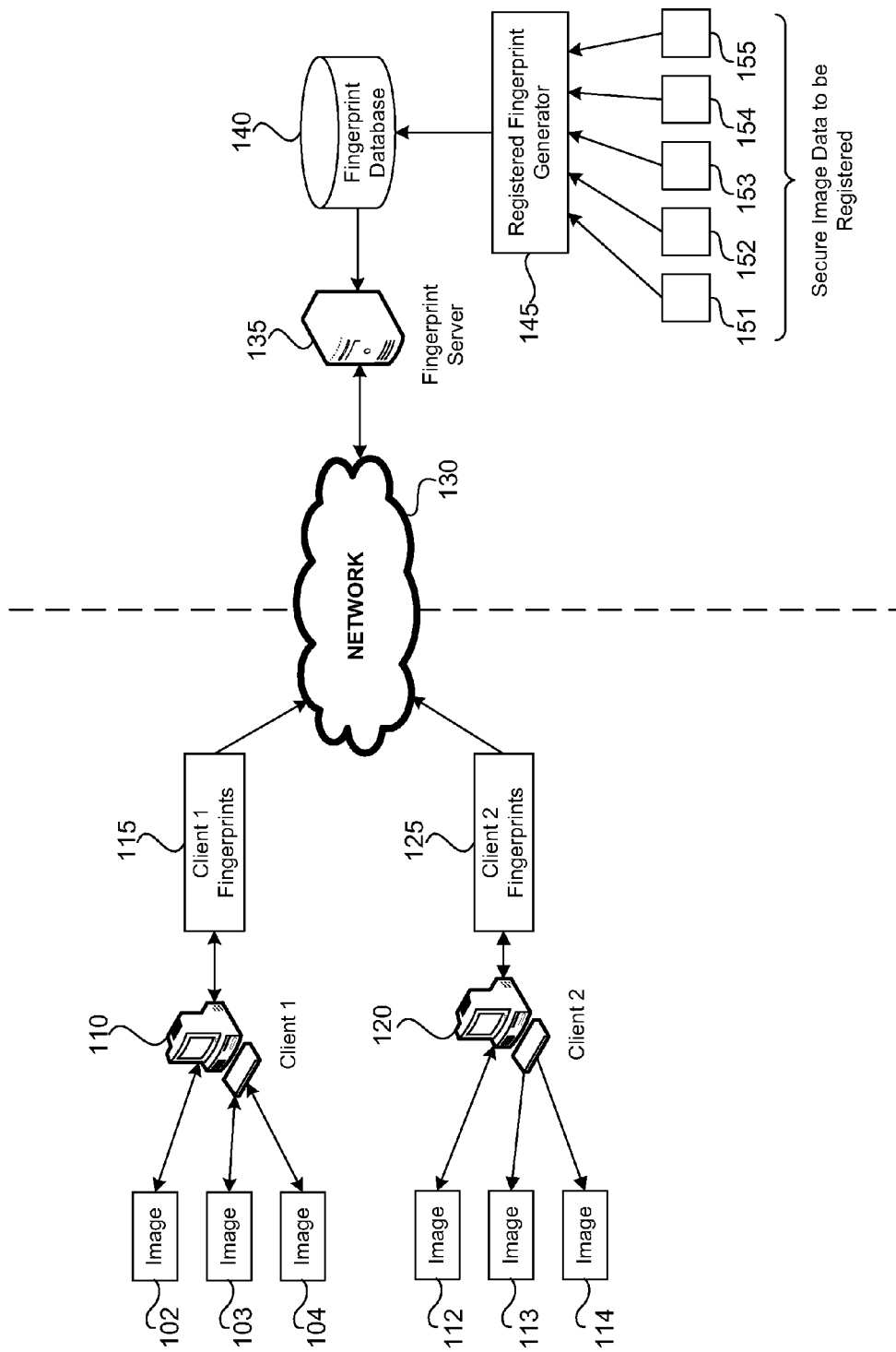
FIG. 1 illustrates an exemplary embodiment of an image fingerprinting and derivative image data detection system.

FIG. 1 illustrates an overall embodiment of a setup to protect an organization's secure image information from unauthorized disclosure. In one embodiment, the setup has several clients (e.g., Client 1 110, Client 2 120, etc.). Each of these clients represents an egress point through which a user may transmit secure image information outside of the organization. An egress point is a location or device through which a user may, for example, transmit information outside of the organization.

When a user desires to transmit image data through a client (e.g., 110, 120, etc.), the client computer, in some instances, generates one or more fingerprints for each image data. As depicted in FIG. 1, client 1 110 accepts image data (e.g., 102, 103, 104, etc.) that a first user desires to transmit through client 1 110. Similarly, client 2 120 also accepts image data (e.g., 112, 113, 114) that a second user desires to transmit through client 2 120. In one embodiment, fingerprinting software is available in each of the clients to generate one or more fingerprints for each image data. The clients contain at least one processor to execute the fingerprinting software. In some instances, the processor is coupled to a memory that stores the instructions corresponding to the fingerprinting software. Examples of the memory include read-only memory (ROM), random access memory (RAM), magnetic disk storage media, optical storage media, flash memory devices, etc.

Detailed information on the various modules of the fingerprinting software and methods for implementing the fingerprinting software are discussed further below.

As illustrated in FIG. 1, in one embodiment, the clients (e.g., 110, 120) generate fingerprints for the image information that users desire to transmit outside of the organization. These fingerprints (e.g., 115, 125) are then compared against a repository of secure or registered fingerprints (e.g., 140).

The setup illustrated in FIG. 1, in some instances, employs a fingerprint server 135. In one embodiment, the fingerprint server 135 stores a fingerprint database 140. In some instances, the fingerprint database 140 contains a repository of fingerprints corresponding to secure image information that the organization intends to protect. Fingerprints are generated from the secure image information (e.g., 151, 152, 153, 154, 155, etc.) that the organization intends to protect.

Fingerprints for the secure image information are generated, in some instances, using a registered fingerprint generator 145. The registered fingerprint generator, in one embodiment, comprises a host computer to perform the operations of a fingerprinting software to generate secure fingerprints. The host computer contains at least one processor to execute the fingerprinting software. In some instances, the processor is coupled to a host memory that stores the instructions corresponding to the fingerprinting software. Examples of the memory include read-only memory (ROM), random access memory (RAM), magnetic disk storage media, optical storage media, flash memory devices, etc.

As discussed above, the secure fingerprints generated using the registered fingerprint software are stored, in some instances, in the fingerprint database 140. The fingerprint server 135 utilizes the fingerprint database 140 to compare client fingerprints (e.g., 115, 125, etc.) against the secure fingerprints corresponding to the secure image information of the organization.

In one embodiment, the client fingerprints (e.g., 115, 125, etc.) are transmitted to the fingerprint server 135 utilizing a network 130. The network 130, in some instances, may be a local network specific to the organization, or in other instances, may be the public internet, or in some other instances, may be combination of a local network and the public internet.

As discussed above, the client fingerprints, in some instances, are transmitted to the fingerprint server 135. The fingerprint server 135 compares the client fingerprints against the secure fingerprints contained in the fingerprint database 140. In some embodiments, when it is determined that one or more of the client fingerprints match against one or more of the secure fingerprints contained in the fingerprint database 140, a suitable security action is initiated.

Examples of such security actions include preventing the information from being transmitted out through the associated client, sending out a security alert to a system administrator, revoking the user's access to the particular information, alerting the user of the security violation, etc. The security actions may also include integration with third party software to offer security solutions (e.g., integration with Microsoft Windows® RMS to apply rights management to the information being disclosed). It is understood that these examples of security actions are used for illustrative purposes only, and that other security actions known to people skilled in the art may suitably be employed.

It is noted that, in some embodiments, the fingerprinting of the image data can occur at locations other than the egress point through which the image is transmitted. In one example, the image data may be transmitted across a network to a remote server, where the fingerprinting operations may be done. Matching of the client fingerprints against a repository of secure fingerprints may also be done at the remote server. In another example, the fingerprints may be locally generated at the site of the egress points, and the client fingerprints may be matched against a lightweight secure fingerprint database locally available at the site of the egress point. The reader's attention is directed to U.S. patent application Ser. No. 12/209,082 titled "Methods and Systems for Protect Agents Using Distributed Lightweight Fingerprints" and U.S. patent application Ser. No. 12/209,096 titled "Methods and Systems to Implement Fingerprint Lookups Across Remote Agents" for detailed information on the implementation of these examples.

Detailed description on the generation of image fingerprints and its application in detecting derivate image data is provided in reference to FIGS. 2-5 below.

Figure 2:
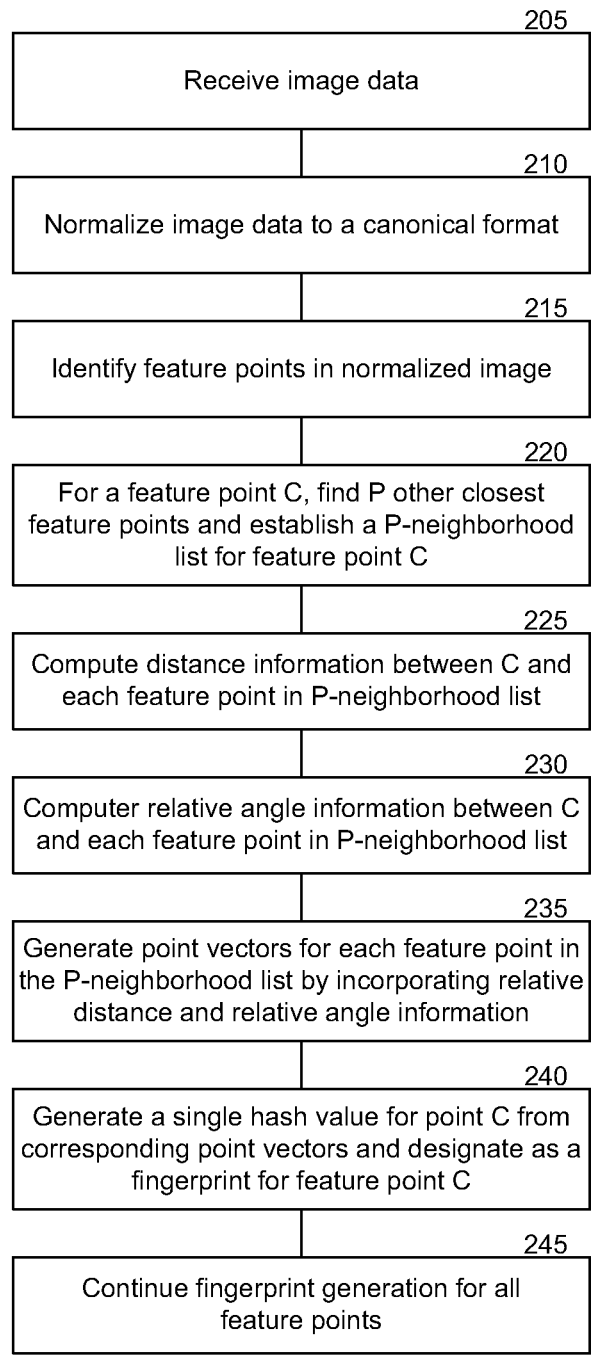
FIG. 2 is a flowchart depicting one embodiment of an overall method to generate image fingerprints.

FIG. 2 is a flowchart depicting a method for generating image fingerprints. In one embodiment, image data to be fingerprinted is first received 205 for further processing. This image data, in some instances, is first normalized to a canonical format 210. The received image may be in one of several digital image formats. Examples of digital image formats include BMP, JPEG, GIF, PNG, etc. The format of the received image data also includes any other digital image format known to people skilled in the art. The received image data, regardless of the format in which it is received, is converted to a common format. In some instances, the image data is represented as a two-dimensional array, with the elements of the array defining attributes or intensity values of the image data (e.g., RGB values, etc.) at each pixel location.

As indicated in step 215 of FIG. 2, in one embodiment, feature points are identified or received from the image data. In some instances, the feature points are identified by locating edges or corners within the image. As indicated above, other algorithmic approaches may also be employed to identify feature points. Examples of such algorithmic approaches include Harris detection, Moravec detection, Shi and Tomasi detection, Harris-Laplace detection, FAST, SIFT, etc. It is noted that, in some instances, the feature points are determined and selected at step 215. In other instances, the technique described with reference to FIG. 2 may start at step 215, where a previously determined set of feature points may be received for further processing.

It is also noted that the techniques described herein are not affected by the specific types or kinds of feature points selected. Therefore, in some instances, edges, corners, specific contrast regions, centers of polygons, etc. appearing in the image data may be employed as feature points. Although there are several approaches available to identify the feature points, it is important that the same approach be employed in both the registration stage (for generation of registered fingerprints for the fingerprint database 140, as explained in FIG. 1), and the identification stage (for generation of client fingerprints 115 and 125, as explained in FIG. 1).

As indicated in step 220, in one embodiment, a P-neighborhood list of feature points is established for each feature point identified/received using step 215. The P-neighborhood is determined, in some instances, by identifying a "P" number of closest feature points to each feature point "C" (hereinafter, "C-Point"). The P-neighborhood is then processed in later stages (as discussed in steps 223-345 below) to generate a fingerprint associated with the C-Point.

The number of feature points in the P-neighborhood of each C-Point influences the accuracy of detection when, for example, the fingerprint server (135 of FIG. 1) compares a client fingerprint against a registered fingerprint. A small number of feature points in the P-neighborhood will, in some instances, increase the probability of false positives (e.g., reporting that a client fingerprint matches against a registered fingerprint when the client fingerprint and registered fingerprint are not associated with the same image data). Therefore, depending on the amount of detection accuracy desired by an organization, the number of feature points in the P-neighborhood can be increased such that small local changes in the image data will be captured in the resulting fingerprint.

In some instances, there may be more than one equally distant closest point to the C-Point, making the overall number of feature points in the P-neighborhood greater than the required "P" value. In such instances, ties can be resolved by, for example, placing a limit on the overall number of equidistant points to consider or record in the P-neighborhood. In other instances, when there are too many equidistant points, the C-Point may be discarded from the feature point list. The justification for discarding such C-Points is that the particular feature point is uninteresting and would not result in a robust fingerprint. This approach of discarding uninteresting C-Points ensures that the overall fingerprint database is efficiently maintained.

There are at least two approaches using which the P-neighborhood may be determined. These two approaches will be discussed in detail with reference to FIG. 3 below.

In step 225, the distance between the C-Point and its associated P-neighborhood feature points are computed and recorded. The distance between two feature points, in some instances, is determined by computing the Euclidean distance between the two feature points. Therefore, if the first feature point is at location (x,y) and the second feature point is at location (x', y'), the distance between the two points can be calculated using the Euclidean distance formula, given by $\sqrt{(x-x')^2+(y-y')^2}$. However, in some embodiments, the techniques described herein use a modified Euclidean distance formula to determine the distance between two feature points for the purpose of establishing the P-neighborhood of each C-Point.

In the modified Euclidean distance formula, the expensive square-root operation is excluded. Even without the square-root operation, the square of the distance values, as determined by $(x-x')^2+(y-y')^2$ preserves the comparative distance between the two feature points, and therefore is adequate to identify the P-neighborhood feature points. The distance between each C-Point and its associated P-neighborhood feature points is computed, and therefore a large number of distance computation steps are involved in image fingerprinting. It is therefore beneficial to exclude the expensive square-root operation of the Euclidean distance formula to considerably reduce the overall computation time.

In some instances, the distance between the C-Point and the P-neighborhood feature points is not sufficient to produce a sufficiently unique description of the feature region. It is therefore desirable to incorporate information about the angle between the C-Point and the P-neighborhood feature points, as indicated in step 230. The distance and angle information between the C-Point and each P-neighborhood point is combined, in some instances, to obtain a vector value (a "point vector"), as indicated in step 235.

In some instances, each point vector may be computed using the distance and angle between the actual locations of the feature points in the image data. However, in derivate image formats, even a small change in the angle of the image may result in the generation of completely different angle values between the feature points, thus resulting in different point vectors. It is therefore beneficial to use "relative" angle and distance information for computation of the point vectors, to maintain consistency in point vectors even in derivate formats of the image data. Detailed description of generation of point vectors by computation of angle and distance information relative to an "anchor point" is provided with reference to FIG. 4 below.

As indicated in step 240, a single hash value is generated for each C-Point by taking in to account all point vectors associated with the P-neighborhood feature points. Therefore, regardless of the number of feature-points included in the P-neighborhood, a single hash value is generated, and this hash value is designated as a fingerprint for the C-Point. Additional details on normalization of the relative distance and angle between the C-Point and all P-neighborhood point vectors and final generation of the hash values is described in greater detail with reference to FIG. 5 below.

After completion of fingerprint generation of a first C-Point, in some instances, the process continues to generate fingerprints for all other feature points identified/received for the image data, as indicated in step 245.

Figure 3:
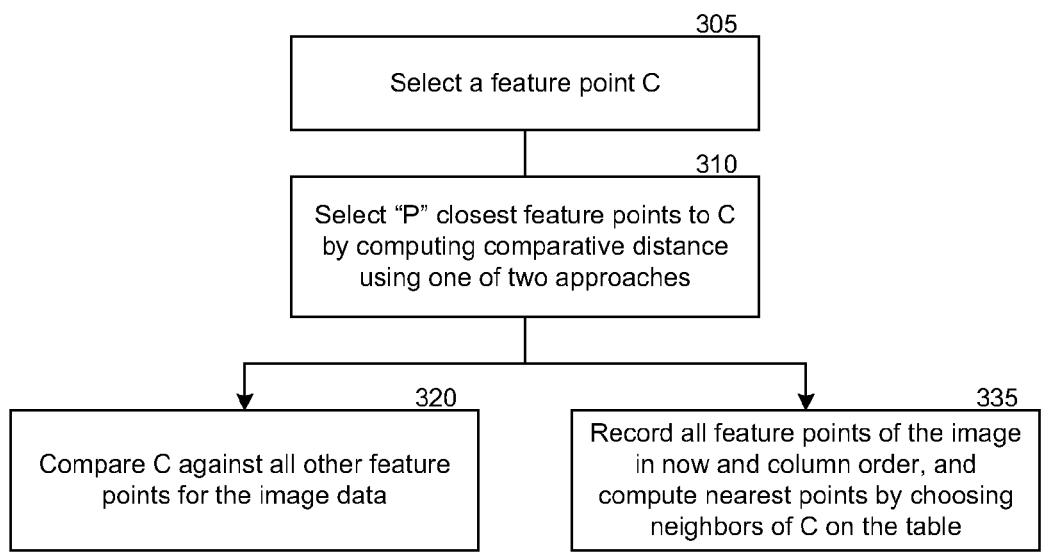
FIG. 3 is a flowchart illustrating a method to generate a P-neighborhood for each feature point.

FIG. 3 is a flow chart illustrating approaches to determine the P-neighborhood feature points for each C-Point. As indicated here, a first C-Point is chosen 305 for determining an associated P-neighborhood. The P-neighborhood, in some instances, involves the determination of P number of closest feature points to the selected C-Point 310. There are at least two approaches through which the P-neighborhood feature points are determined.

In one embodiment, the feature points in the P-neighborhood are determined by computing the distance from the C-Point to every other feature point identified in the image data 320. Based on the resulting distance values, the first P-number of closest feature points are identified to form the P-neighborhood for the C-Point. Because this approach computes the distance from the C-Point to every feature point of the image data, it is computationally expensive, especially because the entire set of computations has to be repeated for every feature point of the image data. For example, if there are n number of feature points in the image data, this approach would require a total of $O(n^2)$ computations.

In another embodiment 335, the feature points of an image data are recorded in row and column order. In some instances, the feature points are recorded, for example, in a table based on their location in the original or normalized image. Here, the search for the nearest feature points for a particular feature point ends after identifying the row and/or column of the maximum point state based on the required number of feature points in the P-neighborhood. This approach is preferable over the approach explained in step 320 due to the considerable reduction in the number of required computations. The effective number of computations in this approach, in some instances, is $2O(n)$. Using this approach also contributes to improving the overall computational efficiency of image fingerprint generation.

Figure 4:
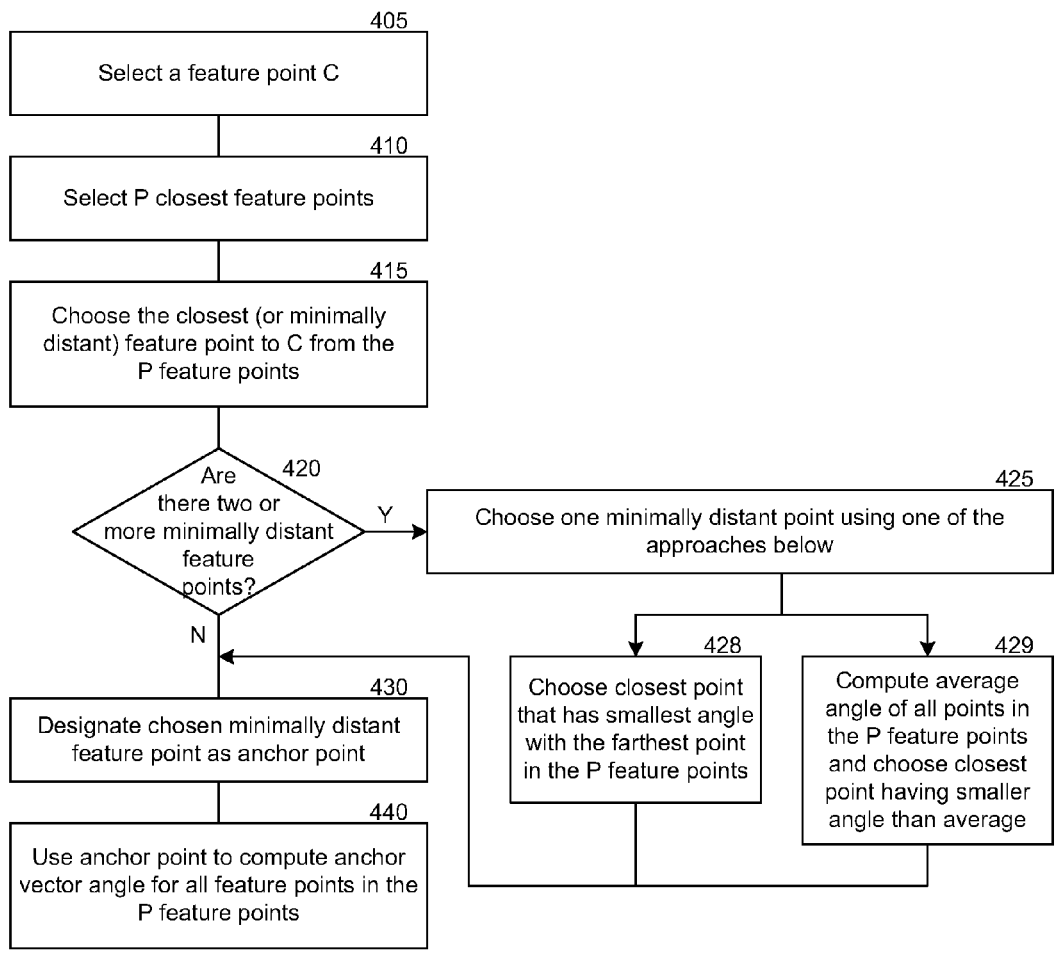
FIG. 4 is a flowchart depicting a method to generate point vectors for a particular feature point.

FIG. 4 is a flow chart depicting techniques for computation of point vectors for each C-Point. A C-Point for which point vectors are to be computed is first selected 405. In step 410, a P-neighborhood, as discussed in detail above, is established for the C-Point by selecting P closest feature points. In some instances, the "closest" of the P closest feature points is identified as an anchor point 415. The anchor point, in other words, is the closest feature point to a C-Point. One of the two comparative distance approaches discussed above (step 320 or step 335 of FIG. 3), for example, may be used in determining the anchor point.

However, in some instances, there may be more than one closest feature points to a C-Point 420. In such instances, one of the closest feature points is chosen as the anchor point by using several approaches 425. In one embodiment, the closest feature point that has the smallest angle with the farthest point in the P-neighborhood is designated as the anchor point 428. In another embodiment, as indicated in step 429, the average angle of all feature points in the P-neighborhood is computed, and the anchor point is chosen based on which closest feature point has a smaller angle to the average angle value. It is understood that other approaches known to people skilled in the art may also be implemented to determine one closest point among several closest points here.

Therefore, using one of several approaches, one least minimally distant feature point is designated as the anchor point 430. The angle between the C-Point and the anchor point is calculated (hereinafter the "anchor vector angle"). In some instances, the anchor vector angle is used to determine the relative angle between the C-Point and the remaining feature points of the P-neighborhood, as indicated in step 440. In one embodiment, the anchor vector angle is assigned, for example, a zero value, and relative angle values are determined for all other feature points in relation to the anchor vector angle.

In some instances, the relative angles are computed in a predetermined direction of rotation. In one embodiment, the direction of rotation is fixed (e.g., the angles are always computed in a clockwise direction relative to the location of the anchor point). In another embodiment, the direction of rotation is determined independently for each P-neighborhood. In some instances, the direction of rotation of a particular P-neighborhood is determined based on features local to that particular P-neighborhood. In one example, the direction is chosen by rotating from the anchor point to another feature point with the smallest angle to the anchor point. In another example, the direction is chosen by rotating from the anchor point to a most-distant feature point in the P-neighborhood.

The use of the localized direction of rotation at the registration and matching stages ensures that the fingerprints are robust against certain changes in derivate image data. For example, flipping or mirror transforms in the derivate image data will cause the relative angles to also flip or mirror correspondingly, resulting in a fingerprint matching the same feature in the original image.

Figure 5:
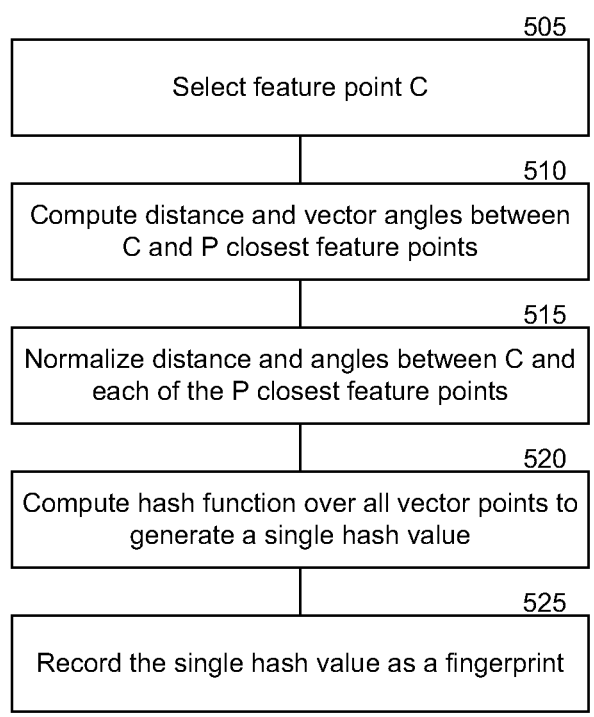
FIG. 5 is a flowchart illustrating a method for generating fingerprints from point vectors.

FIG. 5 is a flow chart that illustrates techniques for generating fingerprints for each feature point using their corresponding point vectors. A feature point (C-Point) for which the fingerprint is to be generated is first chosen 505. The angle and distance between the C-Point and a collection of neighboring feature points is computed to determine point vectors corresponding to the C-Point 510. In some instances, an anchor point is determined, as explained above, to compute the distance and angle of the point vectors relative to this anchor point.

In one embodiment, the distances and angles of each point vector is normalized in relation to the anchor point 515. For example, the value of the distance between the C-Point and each feature point of the P-neighborhood is divided by the distance between the C-Point and the anchor point. The angle values are also, in some instances, normalized in a similar fashion.

A hash function is then run over all the point vectors of the P-neighborhood 520. The hash function, in some instances, is applied in a predetermined direction. For example, one of the directions explained in step 440 of FIG. 4 may be employed to apply the hash function. Any hash function known to people skilled in the art may be applied to compute one final hash value that corresponds to the point vectors of the P-neighborhood of a particular C-Point. In some instances, the point vector corresponding to the anchor point may be excluded from the hash generation, further improving the overall computational efficiency. In one embodiment, the single hash value is an integer calculated based on the point vectors of a particular P-neighborhood. The single hash value is designated as the fingerprint corresponding to the C-Point 525.

In some instances, the angles and distance values are rounded to their nearest floor or ceil values before applying the hash function. This ensures that similar fingerprints are generated for related features of the image data.

In some instances, the normalized point vector data and direction of rotation (as discussed in step 440 of FIG. 4) may also be used as a descriptor of the C-Point instead of generating the fingerprint using the hash generator. In such instances, an ordered list of the point vector data based on the direction of orientation may be considered in a (P−1)*2 dimensional space. In one embodiment, nearest neighbor techniques, for example, may be employed to match client P-neighborhood vector descriptors to registered descriptors. However, this approach increases the overall complexity of the detection and registration processes. Generation of a single fingerprint, as described in FIG. 5, on the other hand, considerably reduces the amount of data stored, and the lookup becomes, for example, a single integer match.

The systems corresponding to the methods explained above and associated embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A computer-implemented method for preventing unauthorized disclosure of secure information, the computer-implemented method comprising:
    storing a plurality of registered fingerprints for secure images of a given organization, wherein each fingerprint of the plurality of registered fingerprints is generated using point vectors computed from feature points identified from each secure image;
    receiving a first image that a user desires to transmit outside of the given organization;
    generating a first set of fingerprints for the first image, wherein each fingerprint of the first set of fingerprints is generated using point vectors computed from feature points identified from the first image;
    determining whether any of the first set of fingerprints is identical to any of the plurality of registered fingerprints; and
    taking a security action when any of the first set of fingerprints is identical to any of the plurality of registered fingerprints,
    wherein the generation of each fingerprint of the first set of fingerprints includes:
        selecting a first feature point in the first image;
        selecting a plurality of neighborhood feature points closest in distance to the first feature point, wherein a least distant feature point, measured relative to the first feature point, of the plurality of neighborhood feature points is designated as an anchor point;
        generating the plurality of point vectors, each point vector computed based on distance and angle between the particular neighborhood feature point and the first feature point, wherein the distance and angle are computed relative to the anchor point; and
        aggregating the plurality of point vectors to generate a fingerprint corresponding to the first feature point.

2. The computer-implemented method for preventing unauthorized disclosure of secure information as recited in claim 1, wherein the plurality of point vectors for a particular feature point are computed based on distance and angle between the particular feature point and a predetermined number of neighboring feature points closest to the particular feature point.

3. The computer-implemented method for preventing unauthorized disclosure of secure information as recited in claim 1, wherein the security action includes at least one of:
    preventing the first image from being disclosed;
    logging the event as a security violation;
    requiring a password from the user to allow the first image to be disclosed;
    blocking the user's access to the first image;
    sending out a security alert; or
    integration of the first image with rights management information.

4. The computer-implemented method for preventing unauthorized disclosure of secure information as recited in claim 1, the computer-implemented method further comprising creating a fingerprint database for the given organization, wherein the fingerprint database comprises the plurality of registered fingerprints for secure images of the given organization.

5. The computer-implemented method for preventing unauthorized disclosure of secure information as recited in claim 1, wherein the first image is at least one of:
- an image contained in an electronic mail;
- an image contained in a file attached to an electronic mail; and
- an image that is transferred using a computer's output device.

6. The computer-implemented method for preventing unauthorized disclosure of secure information as recited in claim 1, wherein the generation of each fingerprint of the first set of fingerprints is identical to the generation of each registered fingerprint of the plurality of registered fingerprints.

7. A system to prevent unauthorized disclosure of secure information outside a given organization, the computer-implemented system comprising:
- a processor;
- a memory;
- a processing component configured to:
  - receive a first image that a user desires to transmit outside of the given organization;
  - generate a first set of fingerprints for the first image, wherein each fingerprint of the first set of fingerprints is generated using point vectors computed from feature points identified from the first image;
  - determine whether any of the first set of fingerprints is identical to any of a plurality of registered fingerprints stored in a fingerprint database communicably coupled to the system;
    - wherein the fingerprint database comprises at least a portion of the plurality of registered fingerprints for secure images of the given organization; and
    - wherein each fingerprint of the plurality of registered fingerprints is generated using point vectors computed from feature points identified from each secure image; and
  - take a security action when any of the first set of fingerprints is identical to any of the plurality of registered fingerprints,
  - wherein, in the generation of each fingerprint of the first set of fingerprints, the processing component is further configured to:
    - select a first feature point in the first image;
    - select a plurality of neighborhood feature points closest in distance to the first feature point, wherein a least distant feature point, measured relative to the first feature point, of the plurality of neighborhood feature points is designated as an anchor point;
    - generate the plurality of point vectors, each point vector computed based on distance and angle between the particular neighborhood feature point and the first feature point, wherein the distance and angle are computed relative to the anchor point; and
    - aggregate the plurality of point vectors to generate a fingerprint corresponding to the first feature point.

8. The system to prevent unauthorized disclosure of secure information as recited in claim 7, wherein the point vectors for a particular feature point are computed based on distance and angle between the particular feature point and a predetermined number of neighboring feature points closest to the particular feature point.

9. The system to prevent unauthorized disclosure of secure information as recited in claim 7, wherein the security action includes at least one of:
- preventing the first image from being disclosed;
- logging the event as a security violation;
- requiring a password from the user to allow the first image to be disclosed;
- blocking the user's access to the first image;
- sending out a security alert; or
- integration of the first image with rights management information.

10. The system to prevent unauthorized disclosure of secure information as recited in claim 7, wherein the first image is at least one of:
- an image contained in an electronic mail;
- an image contained in a file attached to an electronic mail; and
- an image that is transferred using a computer's output device.

11. The system to prevent unauthorized disclosure of secure information as recited in 7, wherein the fingerprint database is a lightweight secure fingerprint database locally available at the site of an egress point through which the user my transmit information outside of the organization.

12. The system to prevent unauthorized disclosure of secure information as recited in 7, wherein the generation of each fingerprint of the first set of fingerprints is identical to the generation of each registered fingerprint of the plurality of registered fingerprints.

13. A computer-implemented method for preventing unauthorized disclosure of secure information, the computer-implemented method comprising:
- storing a plurality of registered fingerprints for secure images of a given organization, wherein each of the plurality of registered fingerprints is generated using a plurality of point vectors computed from feature points identified from each secure image;
- receiving a first image that a user desires to transmit outside of the given organization;
- generating a first set of fingerprints for the first image, wherein the generation of each fingerprint of the first set of fingerprints is identical to the generation of each registered fingerprint of the plurality of registered fingerprints;
- determining whether any of the first set of fingerprints is identical to any of the plurality of registered fingerprints; and
- taking a security action when the first fingerprint is identical to any of the plurality of secure text fingerprints,
  - wherein the generation of each fingerprint of the first set of fingerprints includes:
    - selecting a first feature point in the first image;
    - identifying a plurality of neighborhood feature points closest in distance to the first feature point, wherein the plurality of neighborhood feature points closest in distance to the first feature point includes a P-neighborhood, the P-neighborhood including P number of neighborhood feature points closest in distance to the first feature point;
    - generating the plurality of point vectors, each point vector computed based on distance and angle between a particular neighborhood feature point and the first feature point; and
    - aggregating the plurality of point vectors to generate a fingerprint corresponding to the first feature point; and
    - designating as an anchor point a least distant feature point, the least distant feature point being a specific feature point closest to the first feature point within the P-neighborhood.

14. The computer-implemented method for preventing unauthorized disclosure of secure information as recited in claim 13, wherein the security action includes at least one of:
   preventing the first image from being disclosed;
   logging the event as a security violation;
   requiring a password from the user to allow the first image to be disclosed;
   blocking the user's access to the first image;
   sending out a security alert; or
   integration of the first image with rights management information.

15. The computer-implemented method for preventing unauthorized disclosure of secure information as recited in claim 13, the computer-implemented method further comprising creating a fingerprint database for the given organization, wherein the fingerprint database comprises the plurality of registered fingerprints for secure images of the given organization.

16. The computer-implemented method for preventing unauthorized disclosure of secure information as recited in claim 13, wherein the first image is at least one of:
   an image contained in an electronic mail;
   an image contained in a file attached to an electronic mail; and
   an image that is transferred using a computer's output device.

17. The computer-implemented method for preventing unauthorized disclosure of secure information as recited in claim 13, wherein the determination of whether any of the first set of fingerprints is identical to any of the plurality of registered fingerprints further includes transmitting data across a network to a remote server.

* * * * *